(12) United States Patent
Ravanshid et al.

(10) Patent No.: US 11,343,241 B2
(45) Date of Patent: May 24, 2022

(54) MULTI-CONNECTIVITY COMMUNICATION

(71) Applicants: Azad Ravanshid, Tehran (IR); Alireza Mohammadi, Tehran (IR); Ali Farahbakhsh, Tabriz (IR); Niusha Moshrefi, Tehran (IR); Babak Hosein Khalaj, Tehran (IR)

(72) Inventors: Azad Ravanshid, Tehran (IR); Alireza Mohammadi, Tehran (IR); Ali Farahbakhsh, Tabriz (IR); Niusha Moshrefi, Tehran (IR); Babak Hosein Khalaj, Tehran (IR)

(73) Assignees: SHARIF UNIVERSITY OF TECHNOLOGY, Tehran (IR); MOBILE TELECOMMUNICATION COMPANY OF IRAN (MCI), Tehran (IR)

( * ) Notice: Subject to any disclaimer, the term of this patent is extended or adjusted under 35 U.S.C. 154(b) by 176 days.

(21) Appl. No.: 16/897,307

(22) Filed: Jun. 10, 2020

(65) Prior Publication Data
US 2020/0374282 A1 Nov. 26, 2020

Related U.S. Application Data

(60) Provisional application No. 62/862,074, filed on Jun. 16, 2019.

(51) Int. Cl.
*G06F 12/121* (2016.01)
*G06F 16/64* (2019.01)
(Continued)

(52) U.S. Cl.
CPC .......... *H04L 63/0853* (2013.01); *G06F 9/546* (2013.01); *H04L 41/0803* (2013.01);
(Continued)

(58) Field of Classification Search
USPC ....................................................... 427/393.3
See application file for complete search history.

(56) References Cited

U.S. PATENT DOCUMENTS 6,804,767 B1 * 10/2004 Melvin ................. H04L 45/745
711/216
8,255,466 B2 * 8/2012 Flack ...................... H04L 43/00
709/206
(Continued)

*Primary Examiner* — Jude Jean Gilles
(74) *Attorney, Agent, or Firm* — Bajwa IP Law Firm; Haris Zaheer Bajwa

(57) ABSTRACT

A method for multi-connectivity communication in an application layer of a communication network. The method includes generating a plurality of decision elements and repeating a first iterative process. An $i^{th}$ iteration of the first iterative process includes generating an $i^{th}$ transmit message set by executing an application, transmitting the $i^{th}$ transmit message set from a transmitter to a receiver, receiving an $i^{th}$ receive message set of a plurality of receive message sets, and updating the plurality of decision elements. The $i^{th}$ transmit message set is transmitted over a plurality of networks. The $i^{th}$ transmit message set is transmitted based on the plurality of decision elements. Each transmit message in the $i^{th}$ transmit message set is associated with at least one respective network of the plurality of networks. The plurality of decision elements are updated based on a $j^{th}$ receive message set in the plurality of receive message sets.

20 Claims, 14 Drawing Sheets

(51) Int. Cl.
*H04L 29/06* (2006.01)
*H04L 67/01* (2022.01)
*G06F 9/54* (2006.01)
*H04L 67/146* (2022.01)
*H04L 49/901* (2022.01)
*H04L 41/0803* (2022.01)

(52) U.S. Cl.
CPC .......... *H04L 49/901* (2013.01); *H04L 67/146* (2013.01); *H04L 67/42* (2013.01)

(56) References Cited

U.S. PATENT DOCUMENTS

| | | | |
|---|---|---|---|
| 8,351,461 B2 * | 1/2013 | Duffy | H04L 12/66 370/467 |
| 9,185,170 B1 * | 11/2015 | Grammel | H04L 67/142 |
| 10,476,956 B1 * | 11/2019 | Sahoo | H04L 67/1097 |
| 2017/0201444 A1 * | 7/2017 | Szabo | H04L 43/028 |

* cited by examiner

134

152

MULTI-CONNECTIVITY COMMUNICATION

CROSS-REFERENCE TO RELATED APPLICATION

This application claims the benefit of priority from U.S. Provisional Patent Application Ser. No. 62/862,074, filed on Jun. 16, 2019, and entitled "A METHOD FOR MULTI-CONNECTIVITY AT THE APPLICATION LAYER IN WIRELESS NETWORKS," which is incorporated herein by reference in its entirety.

TECHNICAL FIELD

The present disclosure generally relates to communication networks, and particularly, to multi-connectivity in communication networks.

BACKGROUND

Multi-connectivity facilitates communication between a transmitter and a receiver over different networks simultaneously. In further detail regarding multi-connectivity, a data stream of a transmitter is divided in a number of sub-streams and each sub-stream is transmitted in a specific network. Different sub-streams are then aggregated in a receiver to provide initial data stream that was transmitted. As a result, a throughput of communications is enhanced. On the other hand, transmitting a data stream over different networks may enhance a reliability of communications. Therefore, multi-connectivity may be utilized for providing a communication network with a number of services having widely different quality of service requirements. Multi-connectivity may be performed in various network layers based on a layer in which data division/aggregation is done. Conventional multi-connectivity schemes are performed in low network layers, e.g., physical layer, medium access layer, and network layer. However, multi-connectivity in layers lower than application layer necessitates modifications in hardware and/or operating system of transmitters and receivers. As a result, modifications are costly and non-backward compatible with conventional devices.

There is, therefore, a need for a multi-connectivity method in application layer between a transmitter and a receiver without changes required in hardware and/or operating system of the transmitter and the receiver.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for multi-connectivity communication in an application layer of a communication network. An exemplary method may include generating a plurality of decision elements and repeating a first iterative process. In an exemplary embodiment, the plurality of decision elements may be generated utilizing one or more processors. In an exemplary embodiment, the first iterative process may be repeated utilizing the one or more processors. In an exemplary embodiment, an $i^{th}$ iteration of the first iterative process, where $i \geq 1$, may include generating an $i^{th}$ transmit message set by executing an application, transmitting the $i^{th}$ transmit message set from a transmitter of the communication network to a receiver of the communication network, receiving an $i^{th}$ receive message set of a plurality of receive message sets by the receiver, and updating the plurality of decision elements. In an exemplary embodiment, the $i^{th}$ transmit message set may be transmitted over a plurality of networks. An exemplary $i^{th}$ transmit message set may be transmitted based on the plurality of decision elements. In an exemplary embodiment, each transmit message in the $i^{th}$ transmit message set may be associated with at least one respective network of the plurality of networks. An exemplary $i^{th}$ receive message set may include an $(n, i)^{th}$ receive message where $1 \leq n \leq N$ and N is a number of the plurality of networks. In an exemplary embodiment, an $n^{th}$ plurality of receive messages may include the $(n, i)^{th}$ receive message. An exemplary $i^{th}$ receive message set may be associated with the $i^{th}$ transmit message set. In an exemplary embodiment, each receive message in the $i^{th}$ receive message set may be associated with at least one respective network of the plurality of networks. In an exemplary embodiment, the plurality of decision elements may be updated based on a $j^{th}$ receive message set in the plurality of receive message sets, where $1 \leq j \leq i$.

In an exemplary embodiment, the method may further include transmitting a validation request from a client to a server, receiving the validation request by the server, generating a validity status by validating a client credential, transmitting the validity status from the server to the client, receiving the validity status by the client, generating an offloading set, generating an enforcing set, generating a diversity set, transmitting a validation response from the server to the client, and receiving the validation response by the client. An exemplary validation request may be transmitted prior to generating the plurality of decision elements. In an exemplary embodiment, each of the client and the server may include one of the transmitter or the receiver. An exemplary client may be different from the server. An exemplary validity status may be generated utilizing the one or more processors. An exemplary client credential may be associated with a client identity. An exemplary client identity may be associated with the validation request. An exemplary client credential may be stored in a database of the server. An exemplary validity status may be transmitted responsive to the validity status being invalid. An exemplary offloading set may be generated utilizing the one or more processors. An exemplary offloading set may be generated by extracting a first subset of a plurality of network identities from the database. In an exemplary embodiment, the first subset may be extracted based on the client credential. In an exemplary embodiment, each network identity of the plurality of network identities may be associated with a respective network of the plurality of networks. An exemplary enforcing set may be generated utilizing the one or more processors. An exemplary enforcing set may be generated by extracting a second subset of the plurality of network identities from the database. In an exemplary embodiment, the second subset may be extracted based on the client credential. An exemplary diversity set may be generated utilizing the one or more processors. An exemplary diversity set may be generated by extracting a third subset of the plurality of network identities from the database. In an exemplary embodiment, the third subset may be extracted based on the client credential. An exemplary validation response may be transmitted responsive to the validity status being valid. An exemplary validation response may include the validity status, the offloading set, and the enforcing set.

In an exemplary embodiment, generating the plurality of decision elements may include generating each of the plurality of decision elements. In an exemplary embodiment, each of the plurality of decision elements may be generated by writing one of the plurality of network identities in a circular buffer. An exemplary circular buffer may include a plurality of buffer elements. In an exemplary embodiment, each of the plurality of buffer elements may include a respective address of a plurality of addresses. In an exemplary embodiment, writing the one of the plurality of network identities may include writing the one of the plurality of network identities in a respective address of the plurality of addresses. In an exemplary embodiment, the one of the plurality of network identities may be written with a predefined probability. In an exemplary embodiment, each network identity of the plurality of network identities may be associated with a respective network of the plurality of networks.

In an exemplary embodiment, transmitting the $i^{th}$ transmit message set may include transmitting a $(k, i)^{th}$ transmit message where $1 \leq k \leq K_i$ and $K_i$ is a size of the $i^{th}$ transmit message set. An exemplary $i^{th}$ transmit message set may include the $(k, i)^{th}$ transmit message. In an exemplary embodiment, transmitting the $(k, i)^{th}$ transmit message may include repeating a second iterative process, transmitting the $(k, i)^{th}$ transmit message over a transmit network, and transmitting the $(k, i)^{th}$ transmit message over each diversity network in a diversity network set. In an exemplary embodiment, the second iterative process may be repeated utilizing the one or more processors. In an exemplary embodiment, the second iterative process may be repeated as long as a repetition condition is satisfied. In an exemplary embodiment, the repetition condition may include the offloading set including the $m^{th}$ decision element. In an exemplary embodiment, $m^{th}$ iteration of the second iterative process, where $m \geq 1$, may include extracting an $m^{th}$ decision element of the plurality of decision elements and updating the plurality of addresses. An exemplary $m^{th}$ decision element may be extracted from a predefined read address of the circular buffer. In an exemplary embodiment, the plurality of addresses may be updated by modulo M incrementing each of the plurality of addresses where M is a number of the plurality of buffer elements. In an exemplary embodiment, the plurality of networks may include the transmit network. An exemplary transmit network may be associated with the $m^{th}$ decision element. In an exemplary embodiment, the $(k, i)^{th}$ transmit message may be transmitted over each diversity network simultaneously with transmitting the $(k, i)^{th}$ transmit message over the transmit network. In an exemplary embodiment, each diversity network in the diversity network set may be associated with a respective network identity in the diversity set.

In an exemplary embodiment, updating the plurality of decision elements may include generating an $i^{th}$ token set, transmitting the $i^{th}$ token set from the receiver to the transmitter, receiving the $i^{th}$ token set by the transmitter, generating a plurality of updated decision elements, and replacing the plurality of updated decision elements with the plurality of decision elements. An exemplary $i^{th}$ token set may be generated utilizing the one or more processors. In an exemplary embodiment, each token in the $i^{th}$ token set may be associated with a respective network of the plurality of networks. In an exemplary embodiment, the plurality of updated decision elements may be generated utilizing the one or more processors. In an exemplary embodiment, the plurality of updated decision elements may be generated based on the $i^{th}$ token set.

In an exemplary embodiment, generating the $i^{th}$ token set may include generating an $(n, i)^{th}$ token in the $i^{th}$ token set at an $(n, i)^{th}$ moment. In an exemplary embodiment, the $(n, i)^{th}$ token may be generated responsive to one of a number of the $n^{th}$ plurality of receive messages being equal to an $(n, i)^{th}$ message threshold, an $(n, i)^{th}$ token time being equal to or larger than an $n^{th}$ time threshold, and the enforcing set including an $n^{th}$ network identity of the plurality of network identities. In an exemplary embodiment, each of the $n^{th}$ plurality of receive messages and the $(n, i)^{th}$ message threshold may be associated with an $n^{th}$ network of the plurality of networks. An exemplary $(n, i)^{th}$ message threshold may be equal to or smaller than an $(n, i+1)^{th}$ message threshold. In an exemplary embodiment, each of the $(n, i)^{th}$ token time and the $n^{th}$ time threshold may be associated with the $n^{th}$ network. An exemplary $(n, i)^{th}$ token time may include a difference of the $(n, i)^{th}$ moment and an $(n, r)^{th}$ timestamp of an $n^{th}$ plurality of timestamps. In an exemplary embodiment, the $n^{th}$ plurality of timestamps may include a timestamp of generating an $(n, j)^{th}$ token where $1 \leq j \leq i-1$. An exemplary $(n, r)^{th}$ timestamp may be a largest timestamp of the $n^{th}$ plurality of timestamps. An exemplary $n^{th}$ network identity may be associated with the $n^{th}$ network.

In an exemplary embodiment, generating the plurality of updated decision elements may include generating an $n^{th}$ updated decision element of the plurality of updated decision elements. An exemplary $n^{th}$ updated decision element may be generated responsive to the $i^{th}$ token set including the $(n, i)^{th}$ token. An exemplary $n^{th}$ updated decision element may include the $n^{th}$ network identity. In an exemplary embodiment, replacing the plurality of updated decision elements may include replacing the $n^{th}$ updated decision element. An exemplary $n^{th}$ updated decision element may be updated by writing the $n^{th}$ network identity in a predefined write address of the circular buffer and updating the plurality of addresses. In an exemplary embodiment, the plurality of addresses may be updated by modulo M incrementing each of the plurality of addresses.

An exemplary transmitter may include a plurality of transmit network interfaces. An exemplary $i^{th}$ transmit message set may be transmitted by a plurality of transmit network interfaces. In an exemplary embodiment, an $n^{th}$ transmit network interface of the plurality of transmit network interfaces may be associated with the $n^{th}$ network. An exemplary receiver may include a plurality of receive network interfaces. An exemplary $i^{th}$ receive message set may be received by the plurality of receive network interfaces. In an exemplary embodiment, an $n^{th}$ receive network interface of the plurality of receive network interfaces may be associated with the $n^{th}$ network. In an exemplary embodiment, transmitting the $i^{th}$ token set may include transmitting the $(n, i)^{th}$ token. An exemplary $(n, i)^{th}$ token may be transmitted by the $n^{th}$ receive network interface. In an exemplary embodiment, receiving the $i^{th}$ token set may include receiving the $(n, i)^{th}$ token. An exemplary $(n, i)^{th}$ token may be received by the $n^{th}$ transmit network interface.

In an exemplary embodiment, the $i^{th}$ transmit message set may be transmitted by a first mobile cellular network interface, a first wireless local area network interface, a first Bluetooth network interface, and a first Ethernet network interface. In an exemplary embodiment, the $i^{th}$ receive message set may be received by a second mobile cellular network interface, a second wireless local area network interface, a second Bluetooth network interface, and a second Ethernet network interface.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary method and system for multi-connectivity communication in an application layer of a communication network. An exemplary method may facilitate simultaneous transmission and reception of a number of messages over a number of networks. In doing so, each message may be transmitted over a specific network by a transmitter based on a randomly generated decision. Based on received messages in an exemplary network at a receiver, a token may be generated for the network indicating a quality of communication. An exemplary token for a network may be generated when an event occurs. An exemplary event may occur when a number of received messages from the network reaches a threshold, no messages is received from the network in a given time interval, or a pre-assigned decision is made for transmission in the network, as described below in further detail in sections below. After that, tokens may be transmitted to the transmitter wherein decisions are updated based on a received token from each network. Next messages, then, may be transmitted based on updated decisions.

Figure 1A:
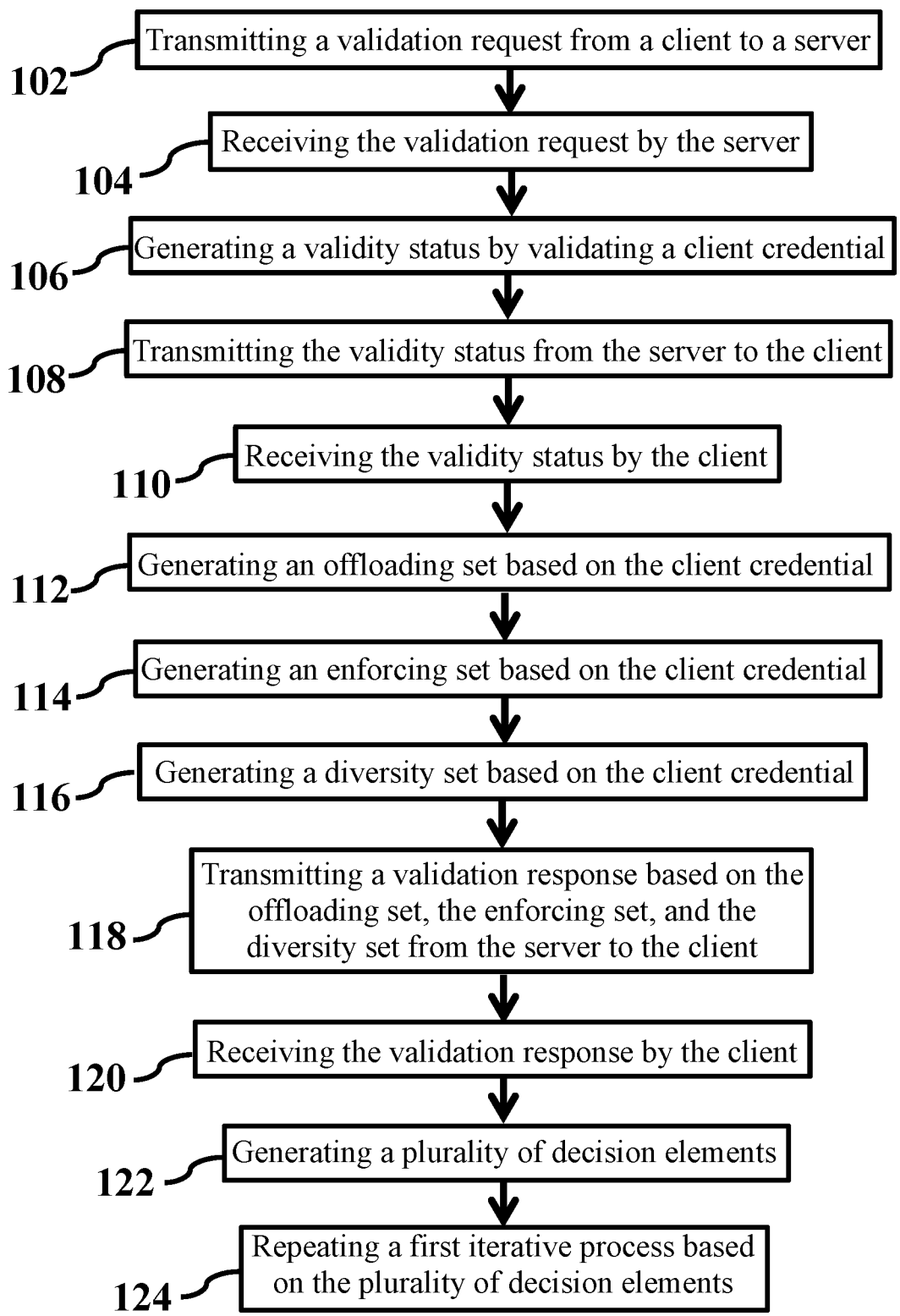
FIG. 1A shows a flowchart of a method for multi-connectivity communication, consistent with one or more exemplary embodiments of the present disclosure.

FIG. 1A shows a flowchart of a method for multi-connectivity communication, consistent with one or more exemplary embodiments of the present disclosure. An exemplary method 100 may include transmitting a validation request from a client to a server (step 102), receiving the validation request by the server (step 104), generating a validity status by validating a client credential (step 106), transmitting the validity status from the server to the client (step 108), receiving the validity status by the client (step 110), generating an offloading set (step 112), generating an enforcing set (step 114), generating a diversity set (step 116), transmitting a validation response from the server to the client (step 118), receiving the validation response by the client (step 120), generating a plurality of decision elements (step 122), and repeating a first iterative process (step 124). In an exemplary embodiment, method 100 may be implemented in an application layer of a communication network.

Figure 2A:
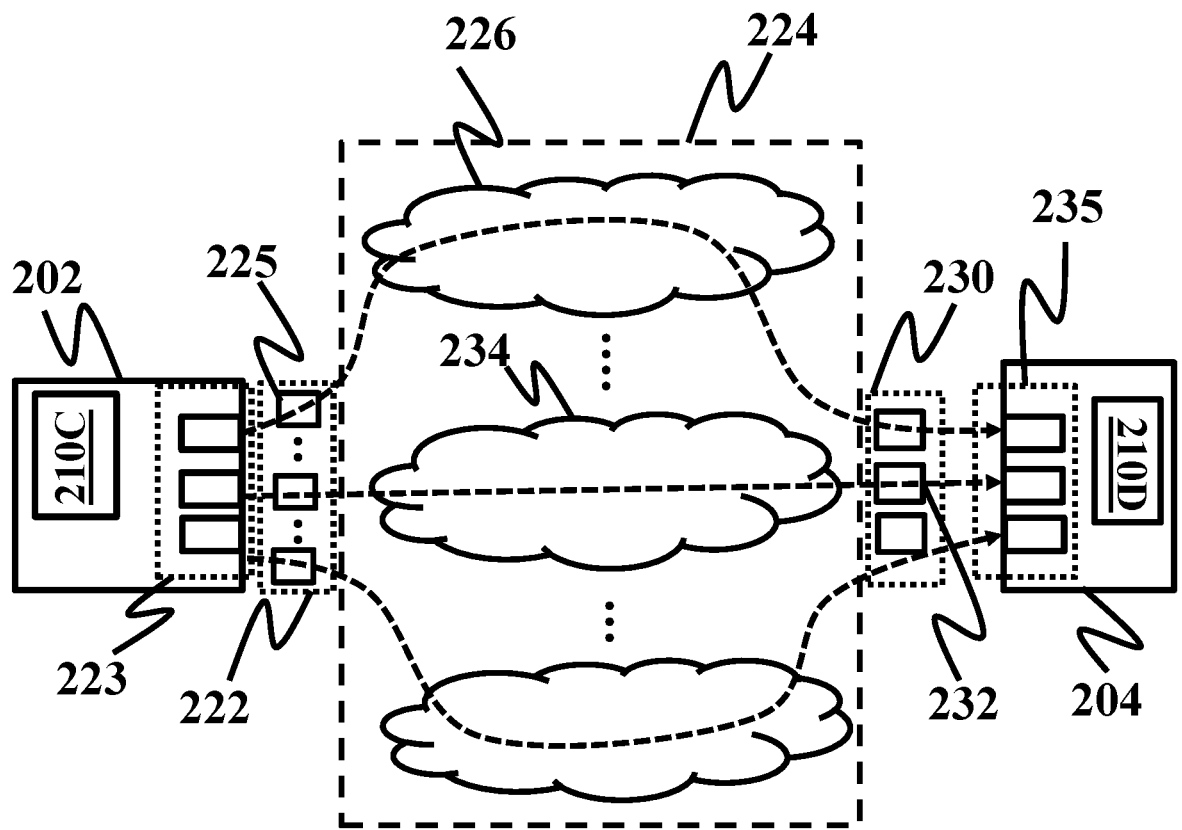
FIG. 2A shows a schematic of a multi-connectivity system, consistent with one or more exemplary embodiments of the present disclosure.

FIG. 2A shows a schematic of a multi-connectivity system, consistent with one or more exemplary embodiments of the present disclosure. In an exemplary embodiment, different steps of method 100 may be implemented utilizing a multi-connectivity system 200. In an exemplary embodiment, multi-connectivity system 200 may include a transmitter 202, a receiver 204.

Figure 2B:
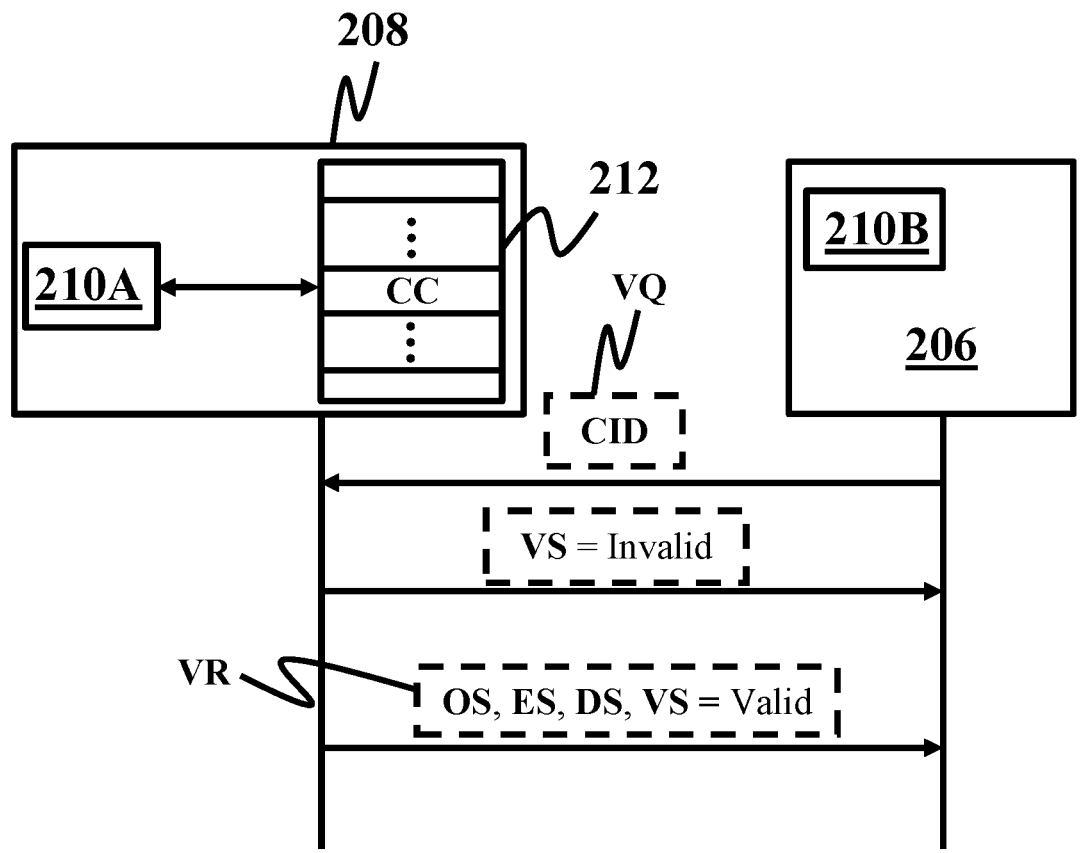
FIG. 2B shows a schematic of a client and a server, consistent with one or more exemplary embodiments of the present disclosure.

For further detail with respect to step 102, FIG. 2B shows a schematic of a client and a server, consistent with one or more exemplary embodiments of the present disclosure. In an exemplary embodiment, step 102 may include transmitting a validation request VR from a client 206 to a server 208. In an exemplary embodiment, transmitter 202 may include one of client 206 and server 208. In an exemplary embodiment, client 206 may refer to an end-user in multi-connectivity system 200. In an exemplary embodiment, client 206 may include a smartphone in a mobile cellular network or a wireless local area network. In an exemplary embodiment, server 208 may refer to a network device that may provide a multi-connectivity communication for client 206. In an exemplary embodiment, an internet service provider may configure server 208 to provide client 206 with a multi-connectivity communication. In an exemplary embodiment, receiver 204 may include one of client 206 and a server 208. In an exemplary embodiment, receiver 204 may be different from transmitter 202. In an exemplary embodiment, client 206 may be configured to transmit validation request VQ to server 208. In an exemplary embodiment, validation request VQ may include a client identity CID.

In further detail regarding step 104, in an exemplary embodiment, step 104 may include receiving validation request VQ by server 208. In an exemplary embodiment, a server processor 210A may configure server 208 to receive validation request VQ from an anchor network of multi-connectivity system 200. An exemplary anchor network may refer to a communication network of a multi-connectivity service provider.

In further detail regarding step 106, in an exemplary embodiment, step 106 may include generating a validity status VS by validating a client credential CC. In an exemplary embodiment, server 208 may be configured to generate validity status VS. In an exemplary embodiment, validity status VS may refer to a permission for utilizing multi-connectivity by client 206. In an exemplary embodiment, validity status VS may include one of a valid value and an invalid value. In an exemplary embodiment, when validity status VS includes the valid value, client 206 may be permitted to benefit from multi-connectivity. In contrast, when validity status VS includes the invalid value, client 206 may not be permitted to benefit from multi-connectivity.

An exemplary validity status VS may be generated by server processor 210A. An exemplary server 208 may include a database 212. An exemplary client credential CC may be extracted from database 212 utilizing client identity CID. An exemplary server processor 210A may find a client address in database 212 by searching client identity CID in database 212. An exemplary client identity CID may refer to a unique identity in database 212 corresponding to client 206. An exemplary server processor 210A may extract client credential CC from the client address. An exemplary server processor 210A may generate validity status VS by reading client credential CC. An exemplary validity status VS may include the valid value when server processor 210A reads the valid value from client credential CC. An exemplary validity status VS may include the invalid value when server processor 210A fails to find client identity CID in database 212 or when server processor 210A reads the invalid value from client credential CC.

For further detail with regards to step 108, in an exemplary embodiment, step 108 may include transmitting validity status VS from server 208 to client 206. In an exemplary embodiment, server 208 may be further configured to transmit validity status VS to client 206 responsive to validity status VS being invalid.

In further detail with regards to step 110, in an exemplary embodiment, step 110 may include receiving validity status VS by client 206. In an exemplary embodiment, a client processor 210B may configure client 206 to receive validity status VS from the anchor network.

In further detail with respect to step 112, in an exemplary embodiment, step 112 may include generating an offloading set OS. In an exemplary embodiment, server 208 may be further configured to generate offloading set OS. In an exemplary embodiment, offloading set OS may be generated utilizing server processor 210A. An exemplary offloading set OS may be generated by extracting a first subset of a plurality of network identities from database 212. An exemplary server processor 210A may be configured to extract the first subset from database 212. In an exemplary embodiment, the first subset may be extracted from the client address wherein client credential CC is stored. An exemplary message may be prohibited to be transmitted over a network identified by offloading set OS.

In further detail with respect to step 114, in an exemplary embodiment, step 114 may include generating an enforcing set ES. In an exemplary embodiment, server 208 may be further configured to generate enforcing set ES. In an exemplary embodiment, enforcing set ES may be generated utilizing server processor 210A. An exemplary enforcing set ES may be generated by extracting a second subset of the plurality of network identities from database 212. An exemplary server processor 210A may be configured to extract the second subset from database 212. In an exemplary embodiment, the second subset may be extracted from the client address wherein client credential CC is stored. An exemplary message may be enforced to be transmitted over a network identified by enforcing set ES.

In further detail with respect to step 116, in an exemplary embodiment, step 116 may include generating a diversity set DS. In an exemplary embodiment, server 208 may be further configured to generate diversity set DS. In an exemplary embodiment, diversity set DS may be generated utilizing server processor 210A. An exemplary diversity set DS may be generated by extracting a third subset of the plurality of network identities from database 212. An exemplary server processor 210A may be configured to extract the third subset from database 212. In an exemplary embodiment, the third subset may be extracted from the client address wherein client credential CC is stored. An exemplary message may be simultaneously transmitted over each network identified by diversity set DS.

For further detail regarding to step 118, in an exemplary embodiment, step 118 may include transmitting a validation response VR. In an exemplary embodiment, server 208 may be further configured to transmit a validation response VR responsive to validity status VS being valid. An exemplary validation response VR may include validity status VS, offloading set OS, enforcing set ES and diversity set DS. In further detail with respect to step 120, in an exemplary embodiment, step 120 may include receiving validation response VR by client 206. In an exemplary embodiment, client processor 210B may configure client 206 to receive validation response VR from the anchor network.

Figure 2C:
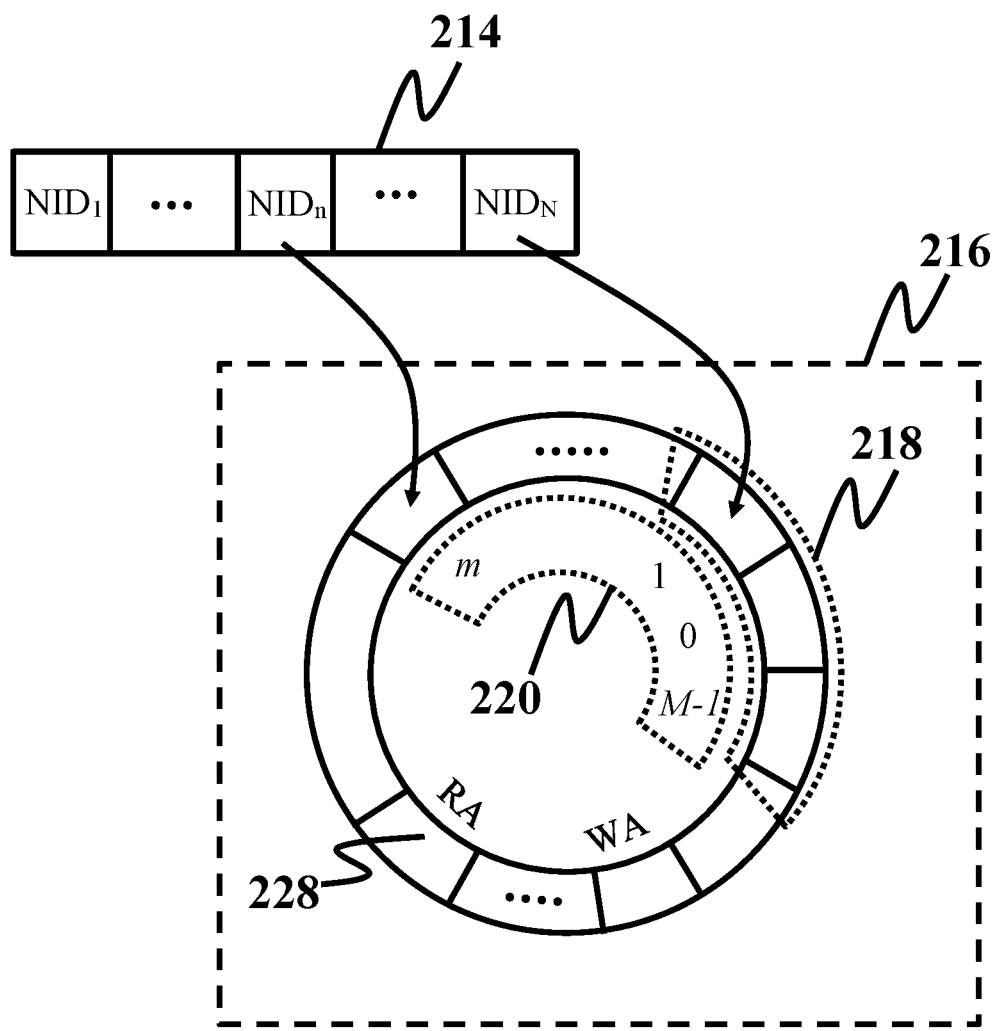
FIG. 2C shows a schematic of a transmitter, consistent with one or more exemplary embodiments of the present disclosure.

For further detail regarding to step 122, FIG. 2C shows a schematic of a transmitter, consistent with one or more exemplary embodiments of the present disclosure. In an exemplary embodiment, transmitter 202 may include a transmit processor 210C. In an exemplary embodiment, transmit processor 210C may be configured to generate the plurality of decision elements. In an exemplary embodiment, generating the plurality of decision elements may include generating each of the plurality of decision elements. In an exemplary embodiment, each of the plurality of decision elements may be generated by writing one of a plurality of network identities 214 in a circular buffer 216. An exemplary transmit processor may be configured to write the one of plurality of network identities 214. An exemplary circular buffer 216 may include a plurality of buffer elements 218. In an exemplary embodiment, each of the plurality of buffer elements 218 may include a respective address of a plurality of addresses 220. In an exemplary embodiment, writing the one of plurality of network identities 214 may include writing the one of plurality of network identities 214 in a respective address of the plurality of addresses 220. In an exemplary embodiment, the one of plurality of network identities 214 may be written with a predefined probability. In an exemplary embodiment, the predefined probability may be the same for all of plurality of network identities 214.

Figure 1B:
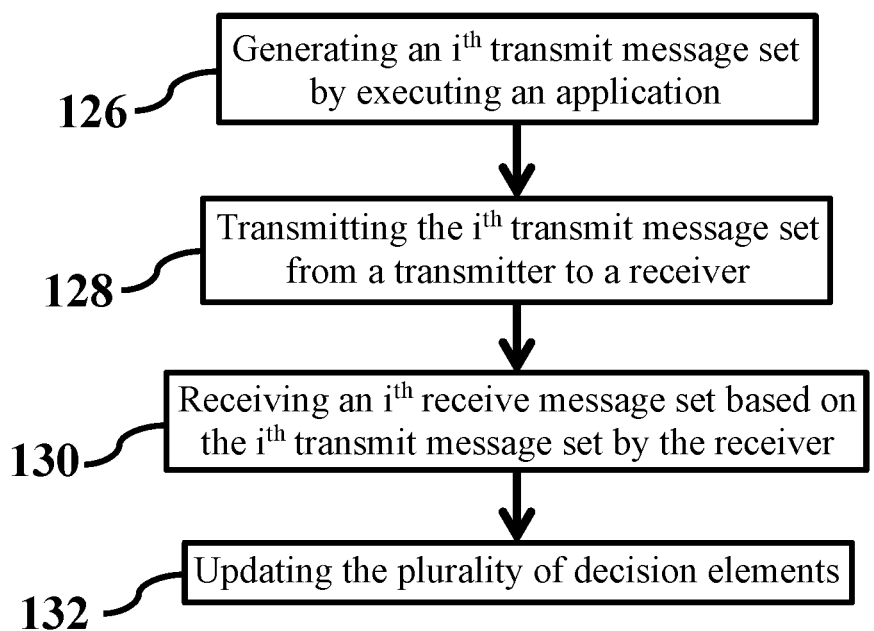
FIG. 1B shows a flowchart for repeating a first iterative process, consistent with one or more exemplary embodiments of the present disclosure.

For further detail with respect to step 124, FIG. 1B shows a flowchart for repeating a first iterative process, consistent with one or more exemplary embodiments of the present disclosure. In an exemplary embodiment, an $i^{th}$ iteration of the first iterative process, where i≥1, may include generating an $i^{th}$ transmit message set by executing an application (step 126), transmitting the $i^{th}$ transmit message set from a transmitter of the communication network to a receiver of the communication network (step 128), receiving an $i^{th}$ receive message set of a plurality of receive message sets by the receiver (step 130), and updating the plurality of decision elements (step 132).

Figure 1C:
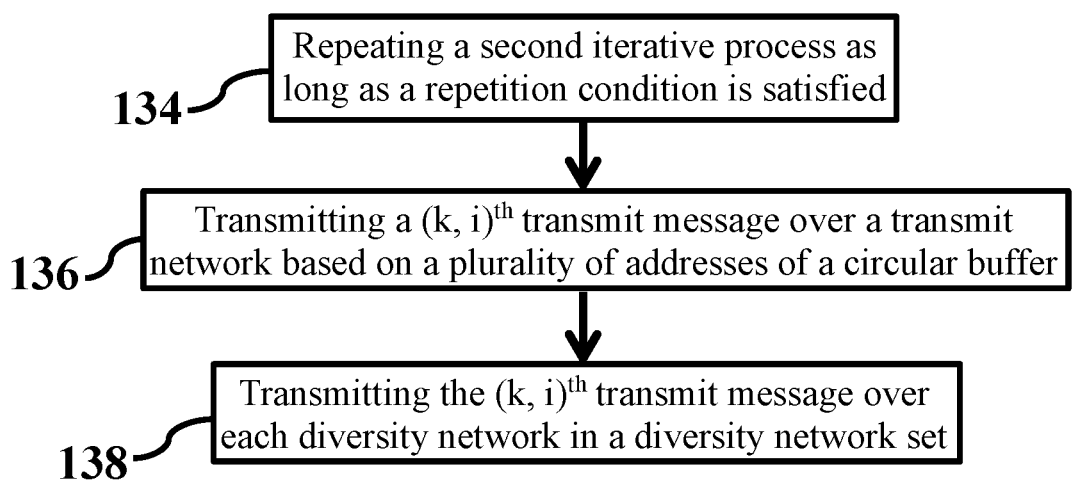
FIG. 1C shows a flowchart for transmitting a transmit message set, consistent with one or more exemplary embodiments of the present disclosure.

For further detail regarding step 126, in an exemplary embodiment, step 126 may include generating an $i^{th}$ transmit message set 222 by executing an application. An exemplary transmit processor 210C may be configured to execute the application. In further detail with regards to step 128, FIG. 1C shows a flowchart for transmitting a transmit message set, consistent with one or more exemplary embodiments of the present disclosure. In an exemplary embodiment, transmitting $i^{th}$ transmit message set 222 may include transmitting a $(k, i)^{th}$ transmit message 225 where $1 \le k \le K_i$ and $K_i$ is a size of $i^{th}$ transmit message set 222. An exemplary $i^{th}$ transmit message set 222 may include $(k, i)^{th}$ transmit message 225. In an exemplary embodiment, transmitting $(k, i)^{th}$ transmit message 225 may include repeating a second iterative process (step 134), transmitting the $(k, i)^{th}$ transmit message 225 over a transmit network 226 of plurality of networks 224 (step 136), and transmitting $(k, i)^{th}$ transmit message 225 over each diversity network in a diversity network set (step 138).

Referring again to FIGS. 1C and 2A, in an exemplary embodiment, step 128 may include transmitting $i^{th}$ transmit message set 222 from transmitter 202 to receiver 204. In an exemplary embodiment, $i^{th}$ transmit message set 222 may be transmitted over a plurality of networks 224. In an exemplary embodiment, each network identity of plurality of network identities 214 may identify a respective network of plurality of networks 224 utilizing a respective network identity. In an exemplary embodiment, each network of plurality of networks 224 may include a respective network identity of plurality of network identities 214. In an exemplary embodiment, each of plurality of network identities 214 may include a unique value. In an exemplary embodiment, each transmit message in $i^{th}$ transmit message set 222 may be transmitted by extracting a transmit decision element of the plurality of decision elements from circular buffer 216. In an exemplary embodiment, each transmit message in $i^{th}$ transmit message set 222 may be transmitted over at least one respective network of plurality of networks 224. In an exemplary embodiment, the at least one respective network of plurality of networks 224 may include the transmit decision element. An exemplary transmitter 202 may include a plurality of transmit network interfaces 223. An exemplary transmit processor 210C may configure plurality of transmit network interfaces 223 to transmit $i^{th}$ transmit message set 222.

Figure 1D:
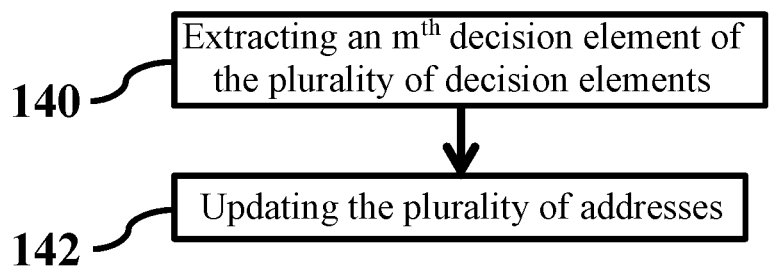
FIG. 1D shows a flowchart for repeating a second iterative process, consistent with one or more exemplary embodiments of the present disclosure.

For further detail regarding step 134, FIG. 1D shows a flowchart for repeating a second iterative process, consistent with one or more exemplary embodiments of the present disclosure. In an exemplary embodiment, step 134 may include repeating the second iterative process. An exemplary transmit processor 210C may be configured to repeat the second iterative process. In an exemplary embodiment, the second iterative process may be repeated as long as a repetition condition is satisfied. In an exemplary embodiment, an $m^{th}$ iteration of the second iterative process, where m≥1, may include extracting an $m^{th}$ decision element 228 of plurality of decision elements 218 (step 140) and updating plurality of addresses 220 (step 142). In an exemplary embodiment, the repetition condition may include offloading set OS including $m^{th}$ decision element 228.

For further detail with respect to step 140, in an exemplary embodiment, step 140 may include extracting $m^{th}$ decision element 228 from a predefined read address RA of circular buffer 216. In an exemplary embodiment, transmit processor 210C may be configured to extract $m^{th}$ decision element 228 from predefined read address RA.

In further detail with regards to step 142, in an exemplary embodiment, step 142 may include updating plurality of addresses 220 by modulo M incrementing each of plurality of addresses 220 where M is a number of plurality of buffer elements 218. As a result, in an $(m+1)^{th}$ iteration, predefined read address RA may include a decision element different from $m^{th}$ decision element 228. In an exemplary embodiment, transmit processor 210C may be configured to update plurality of addresses 220. In an exemplary embodiment, the repetition condition may guarantee that $(k, i)^{th}$ transmit message 225 is not transmitted over a subset of plurality of networks 224 identified by the first subset of plurality of network identities 214 in offloading set OS. In an exemplary embodiment, an administrator of multi-connectivity system 200 may insert the first subset of plurality of network identities 214 in offloading set OS to alleviate a traffic of the subset of plurality of networks 224 identified by the first subset of plurality of network identities 214.

In further detail with regards to step 136, in an exemplary embodiment, step 136 may include transmitting $(k, i)^{th}$ transmit message 225 over transmit network 226. In an exemplary embodiment, transmit network 226 may include a transmit network identity of plurality of network identities 214. In an exemplary embodiment, $m^{th}$ decision element 228 may include the transmit network identity. An exemplary transmit network identity may be extracted from read address RA. An exemplary transmit processor 210C may configure a respective transmit network interface of plurality of transmit network interfaces 223 corresponding to transmit network 226 to transmit $(k, i)^{th}$ transmit message 225.

For further detail with respect to step 138, in an exemplary embodiment, step 138 may include transmitting $(k, i)^{th}$ transmit message 225 over each diversity network of the diversity network set. In an exemplary embodiment, $(k, i)^{th}$ transmit message 225 may be transmitted over each diversity network simultaneously with transmitting $(k, i)^{th}$ transmit message 225 over transmit network 226. In an exemplary embodiment, each diversity network in the diversity network set may be identified by a respective network identity in diversity set DS. In an exemplary embodiment, for increasing a probability of correct reception of messages, a transmit message may be sent over more than one network of plurality of networks 224. In doing so, an administrator of multi-connectivity system 200, may insert the third subset of plurality of network identities 214 in diversity set DS. As a result, each transmit message of $i^{th}$ transmit message set 222 may be transmitted over all of networks identified by the third subset of plurality of network identities 214. To achieve a higher probability of correct reception of messages, a larger size of diversity set DS may be determined by the administrator. In other words, each transmit message may be transmitted over a larger number of networks. An exemplary transmit processor 210C may configure a respective subset of plurality of transmit network interfaces 223 corresponding to diversity set DS to transmit $(k, i)^{th}$ transmit message 225.

For further detail regarding step 130, in an exemplary embodiment, receiving an $i^{th}$ receive message set 230 may include receiving an $(n, i)^{th}$ receive message 232. In an exemplary embodiment, $i^{th}$ receive message set 230 may include $(n, i)^{th}$ receive message 232 where $1 \le n \le N$ and N is a number of plurality of networks 224. In an exemplary embodiment, an $n^{th}$ plurality of receive messages may include $(n, i)^{th}$ receive message 232. In an exemplary embodiment, the $n^{th}$ plurality of receive messages may include a plurality of received messages from an $n^{th}$ network 234 of plurality of networks 224 until $i^{th}$ iteration. An exemplary receiver 204 may include a receive processor 210D and a plurality of receive network interfaces 235. An exemplary receive processor 210D may configure plurality of receive network interfaces 235 to receive $i^{th}$ receive message set 230. In an exemplary embodiment, an $n^{th}$ receive network interface 236 of plurality of receive network interfaces 235 may be configured to receive $(n, i)^{th}$ receive message 232.

An exemplary $i^{th}$ receive message set 230 may be a received version of $i^{th}$ transmit message set 222. In other words, each transmit message in $i^{th}$ transmit message set 222 may change to a respective receive message in $i^{th}$ receive message set 230. In an exemplary embodiment, a subset of $i^{th}$ transmit message set 222 may not be received by receiver 204 due to errors occurred in plurality of networks 224. In an exemplary embodiment, $i^{th}$ receive message set 230 may include a subset of successfully received transmit messages in $i^{th}$ transmit message set 222. In an exemplary embodiment, each receive message in $i^{th}$ receive message set 230 may be received from at least one respective network of plurality of networks 224.

Figure 1E:
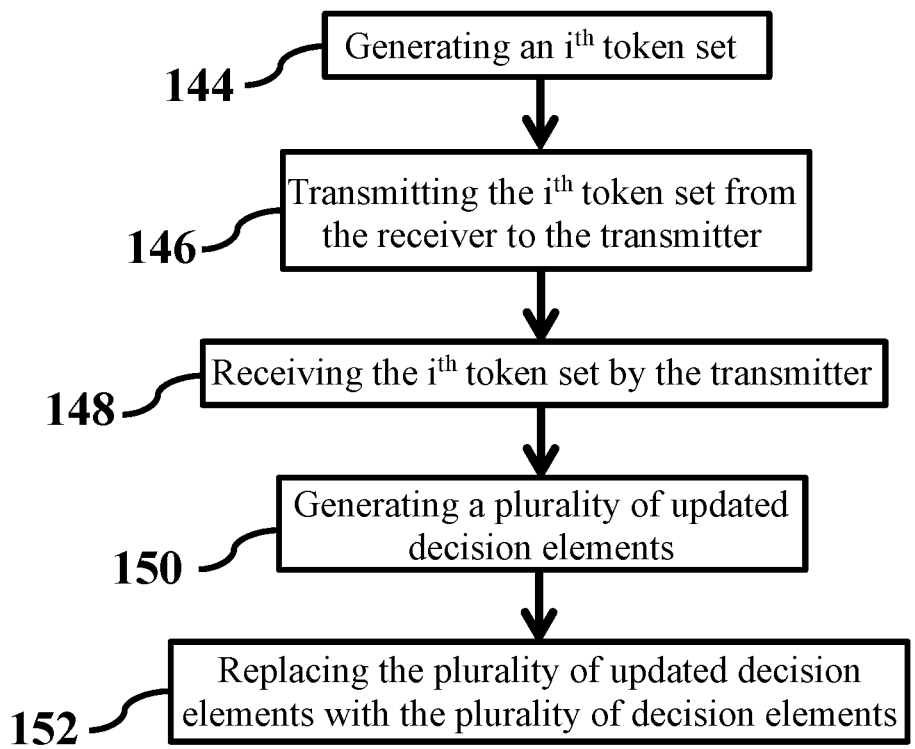
FIG. 1E shows a flowchart for updating a plurality of decision elements, consistent with one or more exemplary embodiments of the present disclosure.

In further detail with respect to step 132, FIG. 1E shows a flowchart for updating a plurality of decision elements, consistent with one or more exemplary embodiments of the present disclosure. In an exemplary embodiment, step 132 may include updating the plurality of decision elements. In an exemplary embodiment, the plurality of decision elements may be updated when a number of the $n^{th}$ plurality of receive messages is larger than a threshold. In an exemplary embodiment, updating the plurality of decision elements may include generating an $i^{th}$ token set (step 144), transmitting the $i^{th}$ token set from the receiver to the transmitter (step 146), receiving the $i^{th}$ token set by the transmitter (step 148), generating a plurality of updated decision elements (step 150), and replacing the plurality of updated decision elements with the plurality of decision elements (step 152).

Figure 2D:
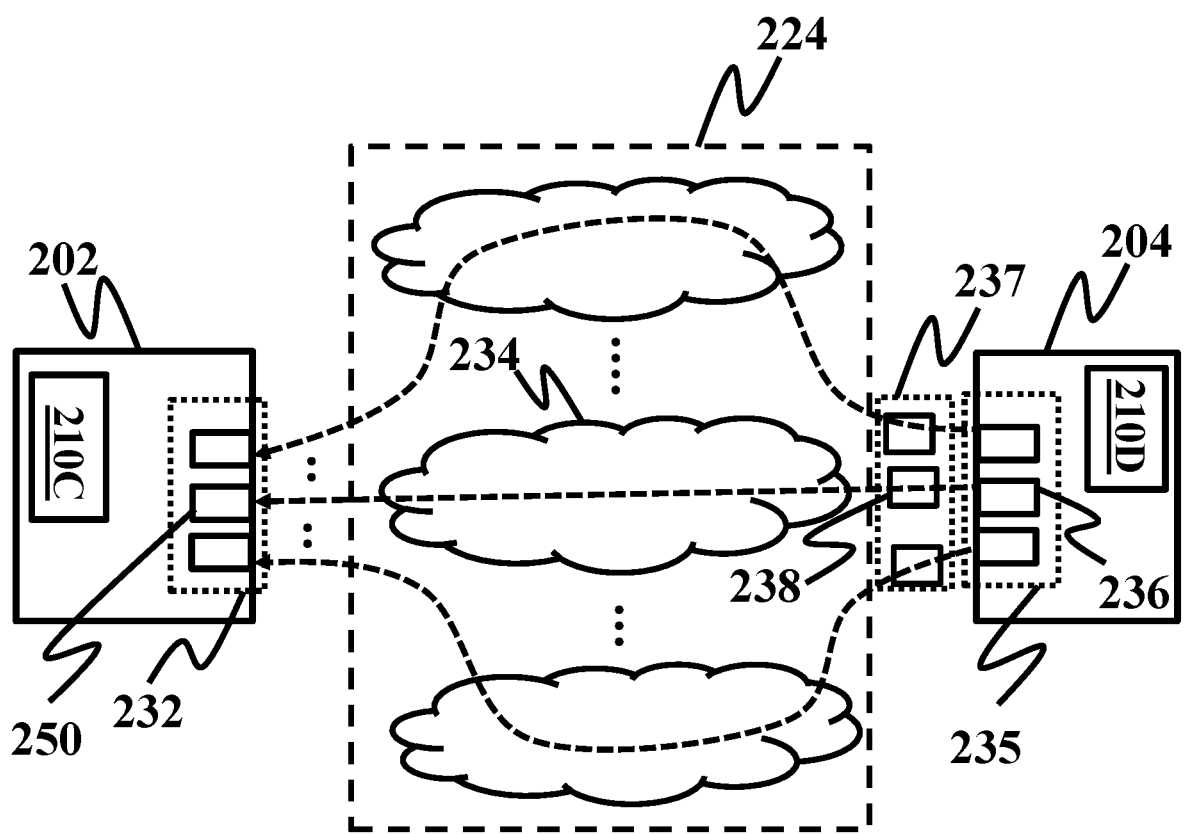
FIG. 2D shows a schematic of a system for transmitting and receiving a token set, consistent with one or more exemplary embodiments of the present disclosure.

For further detail regarding step 144, FIG. 2D shows a schematic of a system for transmitting and receiving a token set, consistent with one or more exemplary embodiments of the present disclosure. FIG. 3 shows a schematic of a plurality of timestamps, consistent with one or more exemplary embodiments of the present disclosure. Referring again to FIGS. 2C-3, in an exemplary embodiment, step 144 may include generating an $i^{th}$ token set 237 by receive processor 210D. In an exemplary embodiment, generating $i^{th}$ token set 237 may include generating an $(n, i)^{th}$ token 238 in $i^{th}$ token set 237 at an $(n, i)^{th}$ moment 302. In an exemplary embodiment, $(n, i)^{th}$ token 238 may be generated responsive to one of a number of the $n^{th}$ plurality of receive messages being equal to an $(n, i)^{th}$ message threshold, an $(n, i)^{th}$ token time 304 being equal to or larger than an $n^{th}$ time threshold, and enforcing set ES including an $n^{th}$ network identity $NIL_n$) of plurality of network identities 214. In an exemplary embodiment, the $(n, i)^{th}$ message threshold may be set for $n^{th}$ network 234. An exemplary $(n, i)^{th}$ message threshold may be equal to or smaller than an $(n, i+1)^{th}$ message threshold. As a result, an $(n, i+1)^{th}$ token may be generated in response to a larger number of the $n^{th}$ plurality of receive messages. In an exemplary embodiment, each of $(n, i)^{th}$ token time 304 and the $n^{th}$ time threshold may be set for $n^{th}$ network 234. An exemplary $(n, i)^{th}$ token time 304 may include a difference of $(n, i)^{th}$ moment 302 and an $(n, r)^{th}$ timestamp 306 of an $n^{th}$ plurality of timestamps 308. In an exemplary embodiment, $n^{th}$ plurality of timestamps 308 may include a timestamp of generating an $(n, j)^{th}$ token where $1 \le j \le i-1$ (i.e., an $(n, j)^{th}$ timestamp 310). An exemplary $(n, r)^{th}$ timestamp 306 may be a largest timestamp of $n^{th}$ plurality of timestamps 308. In an exemplary embodiment, an $(n, r)^{th}$ token may be generated at $(n, r)^{th}$ timestamp 306. In an exemplary embodiment, when no receive message is received from $n^{th}$ network in a time duration of the $n^{th}$ time threshold, $n^{th}$ network 234 may be eliminated from plurality of networks 224 in next iterations (e.g., an iteration s where s>i). To avoid this case, after the $n^{th}$ time threshold from generating the last generated token (i.e., the $(n, r)^{th}$ token), $(n, i)^{th}$ token 238 may be generated. As a result, in next iterations, at least one transmit message may be sent over $n^{th}$ network 234. An exemplary $n^{th}$ network identity $NID_n$ may identify $n^{th}$ network 234. In an exemplary embodiment, when enforcing set ES includes $n^{th}$ network identity $NID_n$, $(n, i)^{th}$ token 238 may be transmitted over $n^{th}$ network 234. As a result, $n^{th}$ network identity may be written in circular buffer 216 by transmit processor 210C. Therefore, $(k, i)^{th}$ transmit message 225 may be transmitted over $n^{th}$ network 234 with higher probability. Repeating this process may result in transmitting more transmit messages over $n^{th}$ network 234 in next iterations of the first iterative process.

In further detail with respect to step 146, in an exemplary embodiment, transmitting $i^{th}$ token set 237 may include transmitting $(n, i)^{th}$ token 238 over $n^{th}$ network 234. An exemplary $(n, i)^{th}$ token 238 may be transmitted by $n^{th}$ receive network interface 236. For further detail with regards to step 148, referring again to FIGS. 1E and 2D, step 148 may include receiving $i^{th}$ token set 237 utilizing transmitter 202. In an exemplary embodiment, transmit processor 210C may configure transmitter 202 to receive $i^{th}$ token set 237. In an exemplary embodiment, receiving $i^{th}$ token set 237 may include receiving $(n, i)^{th}$ token 238 from $n^{th}$ network 234. In an exemplary embodiment, transmit processor 210C may configure an $n^{th}$ transmit network interface 250 of plurality of transmit network interfaces 223 to receive $(n, i)^{th}$ token 238. In an exemplary embodiment, each of plurality of transmit network interfaces 223 and plurality of receive network interfaces 235 may include a mobile cellular network interface, a wireless local area network interface, a Bluetooth network interface, and an Ethernet network interface.

In further detail regarding step 150, in an exemplary embodiment, generating the plurality of updated decision elements may include generating an $n^{th}$ updated decision element of the plurality of updated decision elements. An exemplary transmit processor 210C may be configured to generate the $n^{th}$ updated decision element. An exemplary $n^{th}$ updated decision element may be generated responsive to $i^{th}$ token set 237 including (n, i)$^{th}$ token 238. In this case, the $n^{th}$ updated decision element may include $n^{th}$ network identity $NID_n$.

Figure 1F:
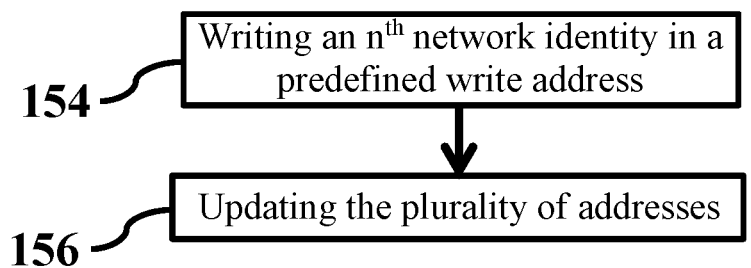
FIG. 1F shows a flowchart for replacing a plurality of updated decision elements, consistent with one or more exemplary embodiments of the present disclosure.

For further detail with regards to step 152, FIG. 1F shows a flowchart for replacing a plurality of updated decision elements, consistent with one or more exemplary embodiments of the present disclosure. Referring again to FIGS. 1F and 2C, in an exemplary embodiment, replacing the plurality of updated decision elements may include replacing the $n^{th}$ updated decision element. An exemplary $n^{th}$ updated decision element may be replaced by writing $n^{th}$ network identity $NID_n$ in a predefined write address WA of circular buffer 216 (step 154) and updating plurality of addresses 220 (step 156).

In further detail regarding step 154, in an exemplary embodiment, step 154 may include writing $n^{th}$ network identity $NID_n$ in predefined write address WA. In an exemplary embodiment, transmit processor 210C may be configured to write $n^{th}$ network identity $NID_n$ in predefined write address WA.

In further detail regarding step 156, in an exemplary embodiment, step 156 may include updating plurality of addresses 220 by modulo M incrementing each of plurality of addresses 220. As a result, in an (i+1)$^{th}$ iteration of the first repeating process, the $n^{th}$ updated decision element may be written in a next buffer element of plurality of buffer elements 218. In an exemplary embodiment, plurality of addresses 220 may be updated after each of extracting $m^{th}$ decision element 228 (step 134) and writing $n^{th}$ network identity $NID_n$ (step 154). On the other hand, extracting $m^{th}$ decision element 228 and writing $n^{th}$ network identity $NID_n$ may be performed at different moments. Therefore, updating plurality of addresses 220 after extracting $m^{th}$ decision element 228 may be performed asynchronous with updating plurality of addresses 220 after writing $n^{th}$ network identity $NID_n$.

Figure 2E:
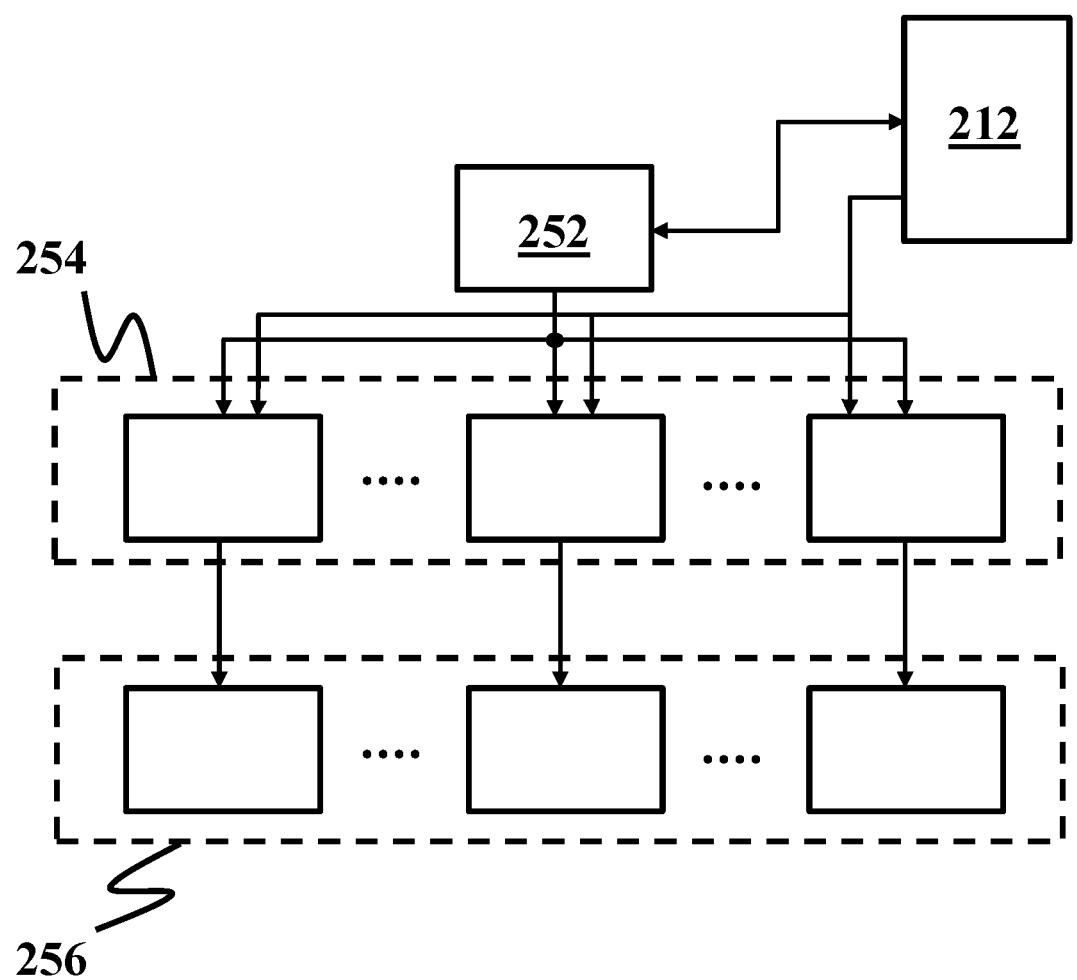
FIG. 2E shows a schematic of a server, consistent with one or more exemplary embodiments of the present disclosure.
Figure 3:
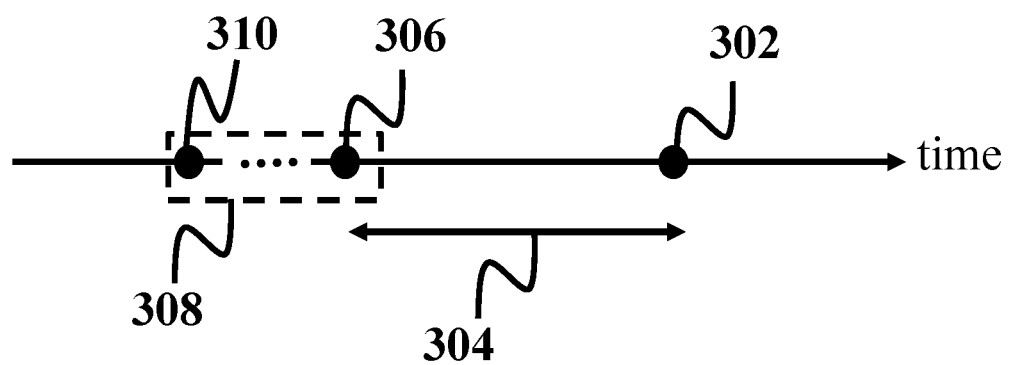
FIG. 3 shows a schematic of a plurality of timestamps, consistent with one or more exemplary embodiments of the present disclosure.

FIG. 2E shows a schematic of a server, consistent with one or more exemplary embodiments of the present disclosure. In an exemplary embodiment, server processor 210A may be configured to implement a panel unit 252, a plurality of controller units 254, and a plurality of worker units 256. In an exemplary embodiment, server processor 210A may be configured to implement each of panel unit 252, plurality of controller units 254, and plurality of worker units 256 on a virtual machine. In an exemplary embodiment, panel unit 252 may be configured to validate client credential CC. In an exemplary embodiment, each of plurality of controller units 254 may be configured to generate offloading set OS, enforcing set ES, and diversity set DS. In an exemplary embodiment, a plurality of clients may transmit a plurality of validation requests. In this case, each of plurality of controller units 254 may be configured to generate offloading set OS, enforcing set ES, and diversity set DS in response to each of the plurality of validation requests. In an exemplary embodiment, when server 208 includes transmitter 202, each of plurality of worker units 256 may be configured to generate a plurality of decision elements, repeat the second iterative process, generate the plurality of updated decision elements, and replace the plurality of updated elements with the plurality of decision elements. In an exemplary embodiment, when server 208 includes receiver 204, each of plurality of worker units 256 may be configured to generate $i^{th}$ token set 237. In an exemplary embodiment, each of plurality of worker units 256 may be coupled with a respective controller unit of plurality of controller units 254.

Figure 4:
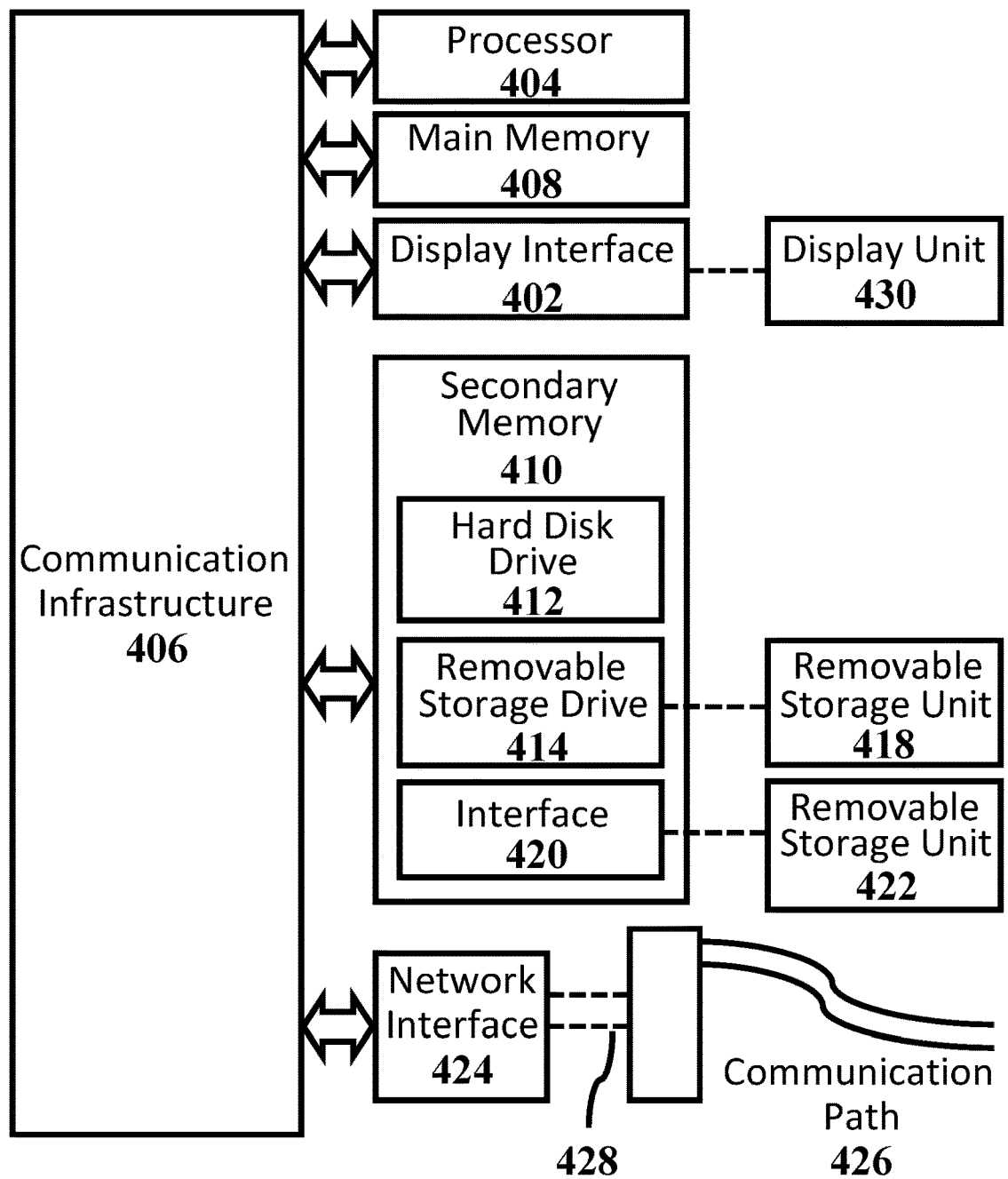
FIG. 4 shows a high-level functional block diagram of a computer system, consistent with one or more exemplary embodiments of the present disclosure.

FIG. 4 shows an example computer system 400 in which an embodiment of the present invention, or portions thereof, may be implemented as computer-readable code, consistent with exemplary embodiments of the present disclosure. For example, different steps of method 100 may be implemented in computer system 400 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-3.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 404 may be a special purpose (e.g., a graphical processing unit) or a general-purpose processor device. As will be appreciated by persons skilled in the relevant art, processor device 404 may also be a single processor in a multi-core/multiprocessor system, such system operating alone, or in a cluster of computing devices operating in a cluster or server farm. Processor device 404 may be connected to a communication infrastructure 406, for example, a bus, message queue, network, or multi-core message-passing scheme.

In an exemplary embodiment, computer system 400 may include a display interface 502, for example a video connector, to transfer data to a display unit 430, for example, a monitor. Computer system 400 may also include a main memory 408, for example, random access memory (RAM), and may also include a secondary memory 410. Secondary memory 410 may include, for example, a hard disk drive 412, and a removable storage drive 414. Removable storage drive 414 may include a floppy disk drive, a magnetic tape drive, an optical disk drive, a flash memory, or the like. Removable storage drive 414 may read from and/or write to a removable storage unit 418 in a well-known manner. Removable storage unit 418 may include a floppy disk, a magnetic tape, an optical disk, etc., which may be read by and written to by removable storage drive 414. As will be appreciated by persons skilled in the relevant art, removable storage unit 418 may include a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 may be in the form of signals, which may be electronic, electromagnetic, optical, or other signals capable of being received by communications interface 424. These signals may be provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Computer program medium and computer usable medium may also refer to memories, such as main memory 508 and secondary memory 410, which may be memory semiconductors (e.g. DRAMs, etc.).

Computer programs (also called computer control logic) are stored in main memory 408 and/or secondary memory 410. Computer programs may also be received via communications interface 424. Such computer programs, when executed, enable computer system 400 to implement different embodiments of the present disclosure as discussed herein. In particular, the computer programs, when executed, enable processor device 404 to implement the processes of the present disclosure, such as the operations in method 100 illustrated by flowchart 100 of FIG. 1A discussed above. Accordingly, such computer programs represent controllers of computer system 400. Where exemplary embodiments of method 100 are implemented using software, the software may be stored in a computer program product and loaded into computer system 400 using removable storage drive 414, interface 420, and hard disk drive 412, or communications interface 424.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Example

In this example, a performance of a method (analogous to method 100) for multi-connectivity is demonstrated. Different steps of the method are implemented utilizing a multi-connectivity system (analogous to multi-connectivity system 200). A plurality of networks (analogous to plurality of networks 224) includes a long term evolution (LTE) network and a wireless local area network (WLAN). The predefined probability of generating the plurality of decision elements is set to about 0.5 for each of the LTE and the WLAN. A throughput of LTE network is about twice of WLAN.

Figure 5:
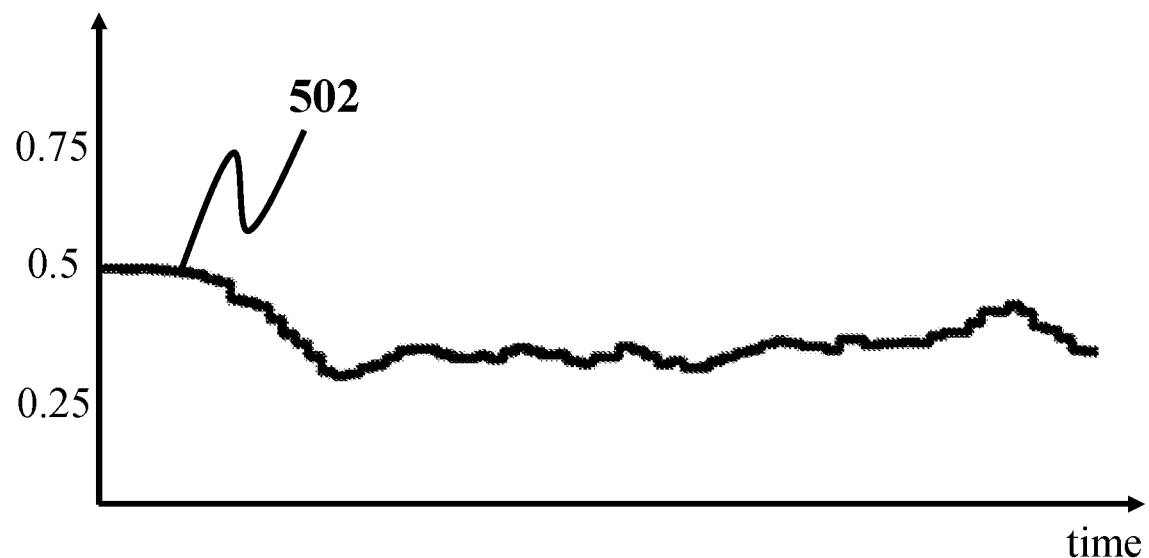
FIG. 5 shows a ratio of generated tokens, consistent with exemplary embodiments of the present disclosure.

FIG. 5 shows a ratio of generated tokens, consistent with exemplary embodiments of the present disclosure. FIG. 5 shows a ratio 502 of generated tokens in the WLAN and a sum of generated tokens in both LTE network and WLAN. As in FIG. 5, in a start time of multi-connectivity, the ratio is about 0.5, which is due to setting the predefined probability equal to 0.5. As time passes, ratio 502 approaches to about 33%, which is a ratio of throughput of WLAN and sum of throughputs of LTE network and WLAN. Moreover, ratio 502 is varying in time because generation of tokens is adapted to an instantaneous quality of each network. For example, when quality of WLAN increases, more tokens are generated in WLAN and therefore, ratio 502 increases as well.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for multi-connectivity communication in an application layer of a communication network, the method comprising:

generating, utilizing one or more processors, a plurality of decision elements; and repeating, utilizing the one or more processors, a first iterative process, an $i^{th}$ iteration of the first iterative process, where $i \geq 1$, comprising:

generating an $i^{th}$ transmit message set by executing an application utilizing the one or more processors;

transmitting the $i^{th}$ transmit message set from a transmitter of the communication network to a receiver of the communication network over a plurality of networks based on the plurality of decision elements, each transmit message in the $i^{th}$ transmit message set associated with at least one respective network of the plurality of networks;

receiving an $i^{th}$ receive message set of a plurality of receive message sets by the receiver, the $i^{th}$ receive message set comprising an $(n, i)^{th}$ receive message of an $n^{th}$ plurality of receive messages where $1 \leq n \leq N$ and N is a number of the plurality of networks, the $i^{th}$ receive message set associated with the $i^{th}$ transmit message set, each receive message in the $i^{th}$ receive message set associated with at least one respective network of the plurality of networks; and updating the plurality of decision elements by:

generating an $i^{th}$ token set based on a $j^{th}$ receive message set in the plurality of receive message sets, where $1 \leq j \leq i$, each token in the $i^{th}$ token set associated with a respective network of the plurality of networks;

transmitting the $i^{th}$ token set from the receiver to the transmitter;

receiving the $i^{th}$ token set by the transmitter;

generating a plurality of updated decision elements based on the $i^{th}$ token set; and replacing the plurality of updated decision elements with the plurality of decision elements.

2. A method for multi-connectivity communication in an application layer of a communication network, the method comprising:

generating, utilizing one or more processors, a plurality of decision elements; and repeating, utilizing the one or more processors, a first iterative process, an $i^{th}$ iteration of the first iterative process, where $i \geq 1$, comprising:

generating an $i^{th}$ transmit message set by executing an application;

transmitting the $i^{th}$ transmit message set from a transmitter of the communication network to a receiver of the communication network over a plurality of networks based on the plurality of decision elements, each transmit message in the $i^{th}$ transmit message set associated with at least one respective network of the plurality of networks;

receiving an $i^{th}$ receive message set of a plurality of receive message sets by the receiver, the $i^{th}$ receive message set comprising an $(n, i)^{th}$ receive message of an $n^{th}$ plurality of receive messages where $1 \leq n \leq N$ and N is a number of the plurality of networks, the $i^{th}$ receive message set associated with the $i^{th}$ transmit message set, each receive message in the $i^{th}$ receive message set associated with at least one respective network of the plurality of networks; and updating the plurality of decision elements based on a $i^{th}$ receive message set in the plurality of receive message sets, where $1 \leq j \leq i$.

3. The method of claim 2 further comprising:
prior to generating the plurality of decision elements, transmitting a validation request from a client to a server, each of the client and the server comprising one of the transmitter or the receiver, the client different from the server;
receiving the validation request by the server;
generating, utilizing the one or more processors, a validity status by validating a client credential associated with a client identity, the client identity associated with the validation request, the client credential stored in a database of the server;
transmitting the validity status from the server to the client responsive to the validity status being invalid;
receiving the validity status by the client;
generating, utilizing the one or more processors, an offloading set by extracting a first subset of a plurality of network identities from the database based on the client credential, each network identity of the plurality of network identities associated with a respective network of the plurality of networks;
generating, utilizing the one or more processors, an enforcing set by extracting a second subset of the plurality of network identities from the database based on the client credential;
generating, utilizing the one or more processors, a diversity set by extracting a third subset of the plurality of network identities from the database based on the client credential;
transmitting a validation response from the server to the client responsive to the validity status being valid, the validation response comprising the validity status, the offloading set, and the enforcing set; and
receiving the validation response by the client.

4. The method of claim 3, wherein generating the plurality of decision elements comprises generating each of the plurality of decision elements by writing one of the plurality of network identities in a circular buffer, the circular buffer comprising a plurality of buffer elements, each of the plurality of buffer elements comprising a respective address of a plurality of addresses, wherein:
writing the one of the plurality of network identities comprises writing the one of the plurality of network identities in a respective address of the plurality of addresses with a predefined probability, each network identity of the plurality of network identities associated with a respective network of the plurality of networks.

5. The method of claim 4, wherein transmitting the $i^{th}$ transmit message set comprises transmitting a $(k, i)^{th}$ transmit message in the $i^{th}$ transmit message set where $1 \leq k \leq K_i$ and $K_i$ is a size of the $i^{th}$ transmit message set, transmitting the $(k, i)^{th}$ transmit message comprising:
repeating, utilizing the one or more processors, a second iterative process as long as a repetition condition is satisfied, an $m^{th}$ iteration of the second iterative process, where $m \geq 1$, comprising:
extracting an $m^{th}$ decision element of the plurality of decision elements from a predefined read address of the circular buffer; and
updating the plurality of addresses by modulo M incrementing each of the plurality of addresses where M is a number of the plurality of buffer elements;
transmitting the $(k, i)^{th}$ transmit message over a transmit network of the plurality of networks, the transmit network associated with the $m^{th}$ decision element; and
transmitting the $(k, i)^{th}$ transmit message over each diversity network in a diversity network set simultaneously with transmitting the $(k, i)^{th}$ transmit message over the transmit network, each diversity network in the diversity network set associated with a respective network identity in the diversity set;
wherein the repetition condition comprises the offloading set comprising the $m^{th}$ decision element.

6. The method of claim 4, wherein updating the plurality of decision elements comprises:
generating an $i^{th}$ token set utilizing the one or more processors, each token in the $i^{th}$ token set associated with a respective network of the plurality of networks;
transmitting the $i^{th}$ token set from the receiver to the transmitter;
receiving the $i^{th}$ token set by the transmitter;
generating, utilizing the one or more processors, a plurality of updated decision elements based on the $i^{th}$ token set; and
replacing the plurality of updated decision elements with the plurality of decision elements.

7. The method of claim 6, wherein generating the $i^{th}$ token set comprises generating an $(n, i)^{th}$ token in the $i^{th}$ token set at an $(n, i)^{th}$ moment responsive to one of:
a number of the $n^{th}$ plurality of receive messages being equal to an $(n, i)^{th}$ message threshold, each of the $n^{th}$ plurality of receive messages and the $(n, i)^{th}$ message threshold associated with an $n^{th}$ network of the plurality of networks, wherein the $(n, i)^{th}$ message threshold is equal to or smaller than an $(n, i+1)^{th}$ message threshold;
an $(n, i)^{th}$ token time being equal to or larger than an $n^{th}$ time threshold, each of the $(n, i)^{th}$ token time and the $n^{th}$ time threshold associated with the $n^{th}$ network, the $(n, i)^{th}$ token time comprising a difference of the $(n, i)^{th}$ moment and an $(n, r)^{th}$ timestamp of an $n^{th}$ plurality of timestamps, the $n^{th}$ plurality of timestamps comprising a timestamp of generating an $(n, j)^{th}$ token where $1 \leq j \leq i-1$ and the $(n, r)^{th}$ timestamp is a largest timestamp of the $n^{th}$ plurality of timestamps; and
the enforcing set comprising an $n^{th}$ network identity of the plurality of network identities, the $n^{th}$ network identity associated with the $n^{th}$ network.

8. The method of claim 7, wherein generating the plurality of updated decision elements comprises generating an $n^{th}$ updated decision element of the plurality of updated decision elements responsive to the $i^{th}$ token set comprising the $(n, i)^{th}$ token, the $n^{th}$ updated decision element comprising the $n^{th}$ network identity.

9. The method of claim 8, wherein replacing the plurality of updated decision elements comprises replacing the $n^{th}$ updated decision element by:
writing the $n^{th}$ network identity in a predefined write address of the circular buffer; and
updating the plurality of addresses by modulo M incrementing each of the plurality of addresses.

10. The method of claim 6, wherein:
transmitting the $i^{th}$ transmit message set comprises transmitting the $i^{th}$ transmit message set by a plurality of transmit network interfaces of the transmitter, an $n^{th}$ transmit network interface of the plurality of transmit network interfaces associated with the $n^{th}$ network;
receiving the $i^{th}$ receive message set comprises receiving the $i^{th}$ receive message set by a plurality of receive network interfaces of the receiver, an $n^{th}$ receive network interface of the plurality of receive network interfaces associated with the $n^{th}$ network;
transmitting the $i^{th}$ token set comprises transmitting the $(n, i)^{th}$ token by the $n^{th}$ receive network interface; and receiving the $i^{th}$ token set comprises receiving the $(n, i)^{th}$ token by the $n^{th}$ transmit network interface.

11. The method claim 10, wherein:
transmitting the $i^{th}$ transmit message set comprises transmitting the $i^{th}$ transmit message set by a first mobile cellular network interface, a first wireless local area network interface, a first Bluetooth network interface, and a first Ethernet network interface; and
receiving the $i^{th}$ receive message set comprises receiving the $i^{th}$ receive message set by a second mobile cellular network interface, a second wireless local area network interface, a second Bluetooth network interface, a second the Ethernet network interface.

12. A system for multi-connectivity communication in an application layer of a communication network, the system comprising:
a transmitter configured to transmit a plurality of transmit message sets, the transmitter comprising one of a client or a server;
a receiver configured to receive a plurality of receive message sets, the receiver comprising one of the client and the server, the receiver different from the transmitter;
a memory having processor-readable instructions stored therein; and
one or more processors configured to access the memory and execute the processor-readable instructions, which, when executed by the one or more processors configures the processor to perform a method, the method comprising:
generating a plurality of decision elements; and
repeating a first iterative process, an $i^{th}$ iteration of the first iterative process, where $i \geq 1$, comprising:
generating an $i^{th}$ transmit message set of the plurality of transmit message sets by executing an application;
transmitting the $i^{th}$ transmit message set from the transmitter to the receiver over a plurality of networks based on the plurality of decision elements, each transmit message in the $i^{th}$ transmit message set associated with at least one respective network of the plurality of networks;
receiving an $i^{th}$ receive message set of the plurality of receive message sets utilizing the receiver, the $i^{th}$ receive message set comprising an $(n, i)^{th}$ receive message of an $n^{th}$ plurality of receive messages where $1 \leq n \leq N$ and N is a number of the plurality of networks, the $i^{th}$ receive message set associated with the $i^{th}$ transmit message set, each receive message in the $i^{th}$ receive message set associated with at least one respective network of the plurality of networks; and
updating the plurality of decision elements based on a $j^{th}$ receive message set in the plurality of receive message sets, where $1 \leq j \leq i$.

13. The system of claim 12, wherein the method further comprises:
prior to generating the plurality of decision elements, transmitting a validation request from the client to the server;
receiving the validation request utilizing the server;
generating a validity status by validating a client credential associated with a client identity, the client identity associated with the validation request, the client credential stored in a database of the server;
transmitting the validity status from the server to the client responsive to the validity status being invalid;
receiving the validity status utilizing the client;
generating an offloading set by extracting a first subset of a plurality of network identities from the database based on the client credential, each network identity of the plurality of network identities associated with a respective network of the plurality of networks;
generating an enforcing set by extracting a second subset of the plurality of network identities from the database based on the client credential;
generating a diversity set by extracting a third subset of the plurality of network identities from the database based on the client credential;
transmitting a validation response from the server to the client responsive to the validity status being valid, the validation response comprising the validity status, the offloading set, and the enforcing set; and
receiving the validation response utilizing the client.

14. The system of claim 13, wherein generating the plurality of decision elements comprises generating each of the plurality of decision elements by writing one of a plurality of network identities in a circular buffer, the circular buffer comprising a plurality of buffer elements, each of the plurality of buffer elements comprising a respective address of a plurality of addresses, wherein:
writing the one of the plurality of network identities comprises writing the one of the plurality of network identities in a respective address of the plurality of addresses with a predefined probability, each network identity of the plurality of network identities associated with a respective network of the plurality of networks.

15. The system of claim 14, wherein transmitting the $i^{th}$ transmit message set comprises transmitting a $(k, i)^{th}$ transmit message in the $i^{th}$ transmit message set where $1 \leq k \leq K_i$ and $K_i$ is a size of the $i^{th}$ transmit message set, transmitting the $(k, i)^{th}$ transmit message comprising:
repeating a second iterative process as long as a repetition condition is satisfied, an $m^{th}$ iteration of the second iterative process, where $m \geq 1$, comprising:
extracting an $m^{th}$ decision element of the plurality of decision elements from a predefined read address of the circular buffer; and
updating the plurality of addresses by modulo M incrementing each of the plurality of addresses where M is a number of the plurality of buffer elements;
transmitting the $(k, i)^{th}$ transmit message over a transmit network of the plurality of networks, the transmit network associated with the $m^{th}$ decision element; and
transmitting the $(k, i)^{th}$ transmit message over each diversity network in a diversity network set simultaneously with transmitting the $(k, i)^{th}$ transmit message over the transmit network, each diversity network in the diversity network set associated with a respective network identity in the diversity set;
wherein the repetition condition comprises the offloading set comprising the $m^{th}$ decision element.

16. The system of claim 14, wherein updating the plurality of decision elements comprises:
generating an $i^{th}$ token set, each token in the $i^{th}$ token set associated with a respective network of the plurality of networks;
transmitting the $i^{th}$ token set from the receiver to the transmitter;
receiving the $i^{th}$ token set utilizing the transmitter;
generating a plurality of updated decision elements based on the $i^{th}$ token set; and
replacing the plurality of updated decision elements with the plurality of decision elements.

17. The system of claim 16, wherein generating the $i^{th}$ token set comprises generating an $(n, i)^{th}$ token in the $i^{th}$ token set at an $(n, i)^{th}$ moment responsive to one of:
- a number of the $n^{th}$ plurality of receive messages being equal to an $(n, i)^{th}$ message threshold, the $n^{th}$ plurality of receive messages and the $(n, i)^{th}$ message threshold associated with an $n^{th}$ network of the plurality of networks, wherein the $(n, i)^{th}$ message threshold is equal to or smaller than an $(n, i+1)^{th}$ message threshold;
- an $(n, i)^{th}$ token time being equal to or larger than an $n^{th}$ time threshold, the $(n, i)^{th}$ token time and the $n^{th}$ time threshold associated with the $n^{th}$ network, the $(n, i)^{th}$ token time comprising a difference of the $(n, i)^{th}$ moment and an $(n, r)^{th}$ timestamp of an $n^{th}$ plurality of timestamps, the $n^{th}$ plurality of timestamps comprising a timestamp of generating an $(n, j)^{th}$ token where $1 \leq j \leq i-1$ and the $(n, r)^{th}$ timestamp is a largest timestamp of the $n^{th}$ plurality of timestamps; and
- the enforcing set comprising an $n^{th}$ network identity of the plurality of network identities, the $n^{th}$ network identity associated with the $n^{th}$ network.

18. The system of claim 17, wherein generating the plurality of updated decision elements comprises generating an $n^{th}$ updated decision element of the plurality of updated decision elements responsive to the $i^{th}$ token set comprising the $(n, i)^{th}$ token, the $n^{th}$ updated decision element comprising the $n^{th}$ network identity.

19. The system of claim 18, wherein replacing the plurality of updated decision elements comprises replacing the $n^{th}$ updated decision element by:
- writing the $n^{th}$ network identity in a predefined write address of the circular buffer; and
- updating the plurality of addresses by modulo M incrementing each of the plurality of addresses.

20. The system of claim 16, wherein:
- the transmitter comprises a plurality of transmit network interfaces configured to transmit the $i^{th}$ transmit message set, an $n^{th}$ transmit network interface of the plurality of transmit network interfaces associated with the $n^{th}$ network, the $n^{th}$ transmit network interface configured to receive the $(n, i)^{th}$ token;
- the receiver comprises a plurality of receive network interfaces configured to receive the $i^{th}$ receive message set, an $n^{th}$ receive network interface of the plurality of receive network interfaces associated with the $n^{th}$ network, the $n^{th}$ receive network interface configured to transmit the $(n, i)^{th}$ token; and
- each of the $n^{th}$ transmit network interface and the $n^{th}$ receive network interface comprises one of a respective mobile cellular network interface, a respective wireless local area network interface, a respective Bluetooth network interface, and a respective Ethernet network interface.

* * * * *